United States Patent
Ouyang et al.

(10) Patent No.: US 10,202,279 B2
(45) Date of Patent: Feb. 12, 2019

(54) CAMG$_2$-BASED ALLOY HYDRIDE MATERIAL FOR HYDROLYSIS PRODUCTION OF HYDROGEN, PREPARATION METHOD THEREFOR AND USE THEREOF

(71) Applicant: SOUTH CHINA UNIVERSITY OF TECHNOLOGY, Guangzhou (CN)

(72) Inventors: Liuzhang Ouyang, Guangzhou (CN); Ruoming Duan, Guangzhou (CN); Hui Wang, Guangzhou (CN); Jiangwen Liu, Guangzhou (CN); Min Zhu, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 15/541,395

(22) PCT Filed: Dec. 29, 2015

(86) PCT No.: PCT/CN2015/099641
§ 371 (c)(1),
(2) Date: Jul. 3, 2017

(87) PCT Pub. No.: WO2016/110208
PCT Pub. Date: Jul. 14, 2016

(65) Prior Publication Data
US 2017/0355600 A1 Dec. 14, 2017

(30) Foreign Application Priority Data
Jan. 9, 2015 (CN) .......................... 2015 1 0011757

(51) Int. Cl.
| | | |
|---|---|---|
| *B22F 9/02* | (2006.01) |
| *B22F 9/04* | (2006.01) |
| *B22F 9/08* | (2006.01) |
| *C01B 3/00* | (2006.01) |
| *C01B 3/06* | (2006.01) |
| *C01B 6/24* | (2006.01) |
| *C22C 1/02* | (2006.01) |
| *C22C 1/04* | (2006.01) |
| *B01J 20/04* | (2006.01) |
| *B01J 20/30* | (2006.01) |

(52) U.S. Cl.
CPC ............ *C01B 3/0031* (2013.01); *B01J 20/04* (2013.01); *B01J 20/3078* (2013.01); *B22F 9/023* (2013.01); *C01B 3/065* (2013.01); *C01B 6/24* (2013.01); *C22C 1/04* (2013.01); *B22F 9/04* (2013.01); *B22F 2998/10* (2013.01); *C01P 2002/72* (2013.01); *C22C 1/02* (2013.01); *Y02E 60/327* (2013.01); *Y02E 60/362* (2013.01)

(58) Field of Classification Search
CPC .................................. C01B 6/02; C01B 6/24
See application file for complete search history.

(56) References Cited

U.S. PATENT DOCUMENTS

| | | | | |
|---|---|---|---|---|
| 6,207,104 B1 * | 3/2001 | Kadir | .................... | C01B 3/0031 420/416 |
| 2002/0146624 A1 | 10/2002 | Goto et al. | | |

FOREIGN PATENT DOCUMENTS

| | | |
|---|---|---|
| CN | 1639367 | 7/2005 |
| CN | 1651587 | 8/2005 |
| CN | 101323918 | 12/2008 |
| CN | 103787273 | 5/2014 |
| CN | 104528649 | 4/2015 |
| JP | 2002060865 | 2/2002 |

OTHER PUBLICATIONS

Shi, Changxu et al. "Hydrogen Storage Material", Material Science and Engineering Handbook (vol. II), article 11, special Functional Materials, Chemical Industry Press et al. version 1, Jan. 31, 2004, pp. 182-183.

* cited by examiner

*Primary Examiner* — Peter F Godenschwager
(74) *Attorney, Agent, or Firm* — JMB Davis Ben-David

(57) ABSTRACT

Provided are a CaMg$_2$-based alloy hydride material for hydrolysis production of hydrogen, a preparation method therefor and a use thereof. The material has a general formula of CaMg$_x$M$_y$H$_z$, wherein M is Ni, Co or Fe, $1.5 \leq x < 2.0$, $0 < y \leq 0.5$, and $3 \leq z < 6$. The preparation method for the material comprises the following steps: (1) stacking three pure metal block materials in a crucible, wherein a metal block material M is placed at the top; (2) installing the crucible in a high-frequency induction melting furnace, evacuating and introducing an argon gas; (3) starting the high-frequency induction melting furnace to heat at a low power first, then increasing the power to uniformly fuse same; and thereafter cooling with the furnace to obtain an alloy ingot, and hammer-milling to obtain a hydrogen storage alloy based on CaMg$_2$; and (4) hydrogenating the hammer-milled hydrogen storage alloy to obtain the material for hydrolysis production of hydrogen. The preparation method is simple and low in cost. The material can absorb hydrogen at normal temperature with a good hydrogen absorption performance. The prepared hydrogen is pure, and can be directly introduced into and used in a hydrogen fuel battery.

13 Claims, 4 Drawing Sheets

CAMG₂-BASED ALLOY HYDRIDE MATERIAL FOR HYDROLYSIS PRODUCTION OF HYDROGEN, PREPARATION METHOD THEREFOR AND USE THEREOF

CROSS-REFERENCE TO RELATED APPLICATIONS

This is the U.S. National Stage of International Application No. PCT/CN2015/099641, filed Dec. 29, 2015, which was published in Chines under PCT Article 21(2), which in turn claims the benefit of China Patent Application No. 201510011757.5, filed Jan. 9, 2015.

FIELD OF THE INVENTION

The present invention relates to the design and preparation of hydrogen storage materials and the hydride materials thereof for hydrolysis production of hydrogen, alloying based on the $CaMg_2$ binary alloy, regulating the alloy phase structure to change the hydrogen storage performance of the materials; designing the structure of the hydrogenated phase, to improve the hydrolysis kinetics of the $CaMg_2$-based alloy hydrides.

BACKGROUND OF THE INVENTION

Hydrogen energy has a high combustion value, zero pollution, rich elements, and other advantages, thus becoming the most potential secondary energy to replace the traditional fossil energy. The large-scale development and utilization of hydrogen energy is expected to solve the current double problems of environmental degradation and energy shortage, but the three major issues of hydrogen production, storage and application have to be solved first. The method of releasing hydrogen from a hydrogen storage alloy, in addition to the reverse reaction of a hydrogenation reaction, also includes producing hydrogen by a hydrolysis reaction, which, compared with the former, has poor reversibility, but can displace an H atom from $H_2O$ in the hydrolysis reaction, making the amount of produced hydrogen greatly increased. And hydrolysis production of hydrogen has the characteristics of producing hydrogen on site, using pure water as raw materials, needing no heat and pressure regulation, convenient and fast application, and safe operation. The $NaBH_4$-based instant hydrogen supply system launched by American Millennium Cell Company in 2001 is successfully applied to the Chrysler sodium fuel cell concept car, confirming the practicality of instant hydrolysis supply of hydrogen. Due to the many advantages of hydrolysis production of hydrogen, hydrolysis devices for hydrogen production will inevitably occupy a place in the large-scale use of hydrogen energy.

The goal set by U.S. Department of Energy (DOE) for the vehicle hydrogen storage system is that the hydrogen storage mass density is not less than 6.5% and the hydrogen storage volumetric density not less than 62 kg $H_2/m^3$, for which the relatively light-mass elements should be used; taking into account the safety and availability of raw materials, $CaMg_2$ alloy has great potential. It has a theoretical hydrogen content of 6.3 wt %, and have wide raw material sources and low prices; however, its hydrogen absorption temperature is too high, and its hydrogenation reaction produces of $CaH_2$ and $MgH_2$ are low reversibility. It was reported that $CaH_2$ and $MgH_2$ were subjected to hydrolysis reaction after ball milling, in which $CaH_2$ could effectively improve the hydrolysis rate and degree of $MgH_2$, with 80% of the theoretical hydrogen production reached after 30 min. If $CaMg_2$ is used as the raw material, producing dispersed $CaH_2$ and $MgH_2$ in situ after hydrogenation will help to improve the kinetic properties of the hydrolysis.

But high temperature and high pressure are needed for $CaMg_2$ to be hydrogenated, and having high hydrogenation reaction activation energy. How to reduce its activation energy will become very important in the industrial production. It is the technical problem currently to be solved to cost less energy to obtain the hydride thereof and then produce hydrogen by hydrolysis.

CONTENTS OF THE INVENTION

The primary object of the present invention is to provide a method for improving the hydrogen absorption performance of the $CaMg_2$ alloy, which reduces its hydrogen absorption temperature from above 300° C. to room temperature while not reducing its hydrogen storage capacity as far as possible. The present invention, by alloying, retains the effective hydrogen storage capacity of the alloy as much as possible, improves the hydrogen absorption performance of the material, and reduces the activation energy of the hydrogenation reaction, so as to produce a $CaMg_2$-based alloy hydride material for hydrolysis production of hydrogen, which will effectively improve the hydrogen absorption performance of $CaMg_2$ and the hydrolysis performance of the hydride thereof.

Another object of the present invention is to provide hydrogen storage alloys of $CaMg_{2-x}M_x$ (x=0.1 or 0.2, M is Ni, Fe or Co) prepared by the above method.

A further object of the present invention is to provide a method for hydrolysis production of hydrogen using the $CaMg_2$-based alloy hydrides produced by hydrogenation of the above hydrogen storage alloys as the materials.

The objects of the present invention are achieved through the following technical solution:

A $CaMg_2$-based alloy hydride material for hydrolysis production of hydrogen is provided, having a general formula of $CaMg_xM_yH_z$, wherein M is Ni, Co or Fe, 1.5≤x<2.0, 0<y≤0.5, and 3≤z<6.

The method for the above materials comprises the following steps:

(1) stacking three pure metal block materials of Ca, Mg and M in a crucible, wherein a metal block material M is placed at the top;

(2) installing the crucible in step (1) in a high-frequency induction melting furnace, evacuating and introducing an argon gas as a protective gas, with the crucible having a vent at the upper part (the position of the vent is higher than the total height of the block materials to prevent the molten metal from flowing out);

(3) starting the high-frequency induction melting furnace to heat at a low power first for 2 to 3 min, then increasing the power to melt the metal block materials into a liquid, and keeping for a certain period of time to uniformly fuse the same; and thereafter cooling with the furnace to obtain an alloy ingot, and hammer-milling the alloy ingot to obtain the $CaMg_2$-based hydrogen storage alloy; and (4) hydrogenating the hammer-milled hydrogen storage alloy at a hydrogenation temperature of 25° C.-100° C. and a hydrogen pressure of 40-60 atm for 1-15 h, thus obtaining a $CaMg_2$-based alloy hydride material for hydrolysis production of hydrogen.

In step (1), weighing according to the atomic ratio of the pure metals in the formula, with the atomic ratio of Ca:Mg:M being 1:(1.8-1.9):(0.1-0.2).

Ca and Mg in step (1) are excess by 6% to 8% as the burning loss.

The mass ratio of the three pure metal block materials of Ca, Mg and M are calculated on the basis of formula of $CaMg_{2-x}M_x$ ($0.1 \leq x < 0.2$) with the addition of the burning loss of 6% to 8% to be (42.4-43.2):(46.4-49.9):(5.8-11.7), (42.4-43.2):(46.4-49.9):(5.9-11.8) and (42.4-43.2):(46.4-49.9):(5.6-11.2) in the order of Ni, Co and Fe, respectively.

In step (1), the purity of Ca≥95%, and the purity of Mg and M≥99%.

In step (2), the vessel is evacuated to 5×10-3 Pa, and the pressure of the introduced argon gas is 0.5 atm.

The alloy ingot in step (3) is repeatedly molten 2 to 3 times according to the previous method.

The process of loading the pure metal block materials into the alumina crucible in step (1) and the process of hammer-milling the alloy ingot are carried out in a glove box filled with an inert gas.

The alloy needed no activation prior to hydrogenation; the prepared hydrogen storage material of $CaMg_{2-x}M_x$—H (x=0.1 or 0.2, M is Ni, Fe or Co) is used in a device for hydrolysis production of hydrogen, a fuel cell, a hydride hydrogen-storage device, heat storage and transfer, and hydrogen separation and recovery.

The present invention has the following effects and advantages compared to the prior art:

(1) The present invention has greatly improved the hydrogen absorption performance compared with the unalloyed $CaMg_2$. The $CaMg_2$ can absorb hydrogen only above 300° C., while the ternary alloy based on $CaMg_2$ prepared by the present invention can absorb hydrogen at 25° C.

(2) For preparation of the materials, the present invention uses the high-frequency induction melting method to melt alloys, which having greatly different melting points, thus the burning loss having to be considered for an alloy having a low melting point.

(3) For preparation of the materials, compared with powder sintering and tantalum container coated heating, the present invention is more economical and consumes less power.

(4) The main phase composition of the materials is $CaMg_2$ phase, while the traditional hydrogen storage alloys are mainly based on $CaNi_2$, $CaNi_5$ and $Mg_2Ni$, compared with which the present invention is greatly increased in the hydrogen storage capacity.

(5) Unlike the traditional hydrogen storage materials, the materials produced by the present invention need no activation, and can absorb hydrogen at room temperature, and the first hydrogen absorption capacity reaching 90% of the theoretical hydrogen absorption capacity.

(6) Unlike the traditional hydrogen storage materials, the materials produced by the present invention release hydrogen through hydrolysis, which is carried out with pure water at room temperature and atmospheric pressure; the hydrogen production capacity is up to 11.85 wt %, i.e., 1 g of the material can release up to 1327.8 mL of hydrogen. The kinetics of the hydrolysis reaction are fast, and can release 96% of the theoretical hydrogen production capacity within 8 min. Reaction with water to produce hydrogen has the advantage of free from environmental impact, easy to manufacture, and the reaction products environmentally friendly.

(7) The materials used in the present invention with the advantage of rich resources, low prices and simple methods, can be obtained by hydriding at room temperature, and have a good hydrogen absorption performance; and the hydrogen prepared by hydrolysis is pure and can be directly introduced into and used in a hydrogen fuel battery, conducive to industrial applications.

DETAILED DESCRIPTION OF THE EMBODIMENTS

The present invention will be further described in detail below with reference to some examples; however, the embodiments of the present invention are not limited thereto.

Example 1

Figure 1:
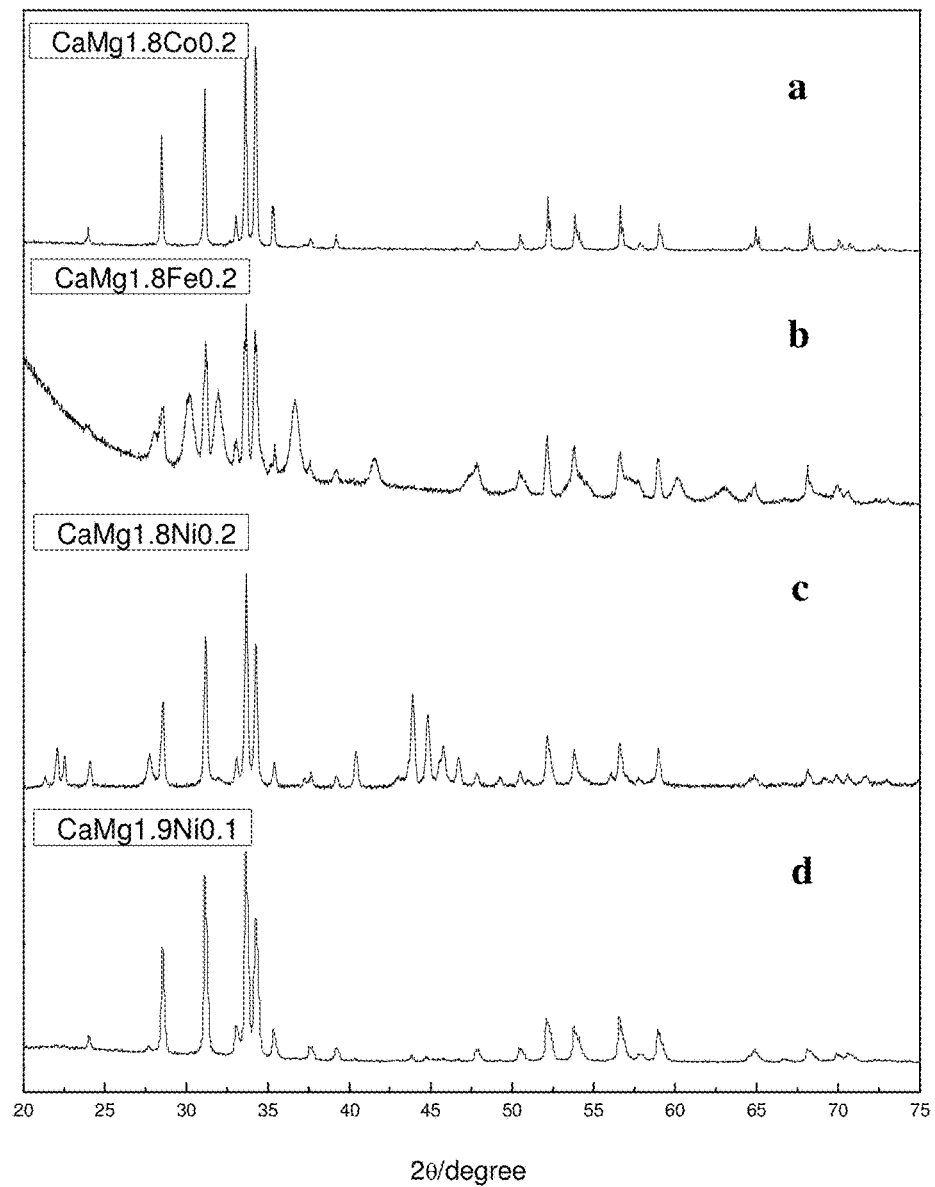
FIG. 1 shows XRD patterns of the alloys prepared according to the present invention. a, b, c and d represent $CaMg_{1.8}Co_{0.2}$, $CaMg_{1.8}Fe_{0.2}$, $CaMg_{1.8}Ni_{0.2}$ and $CaMg_{1.9}Ni_{0.1}$, respectively, the main phase is $CaMg_2$, the Ca—Mg—Ni alloy has the $MgNi_2$ peaks of the C36 phase between 20°-25° and 40°-50°, and the Ca—Mg—Co and Ca—Mg—Fe alloys are found to have no obvious miscellaneous peak except the main phase of $CaMg_2$.
Figure 2:
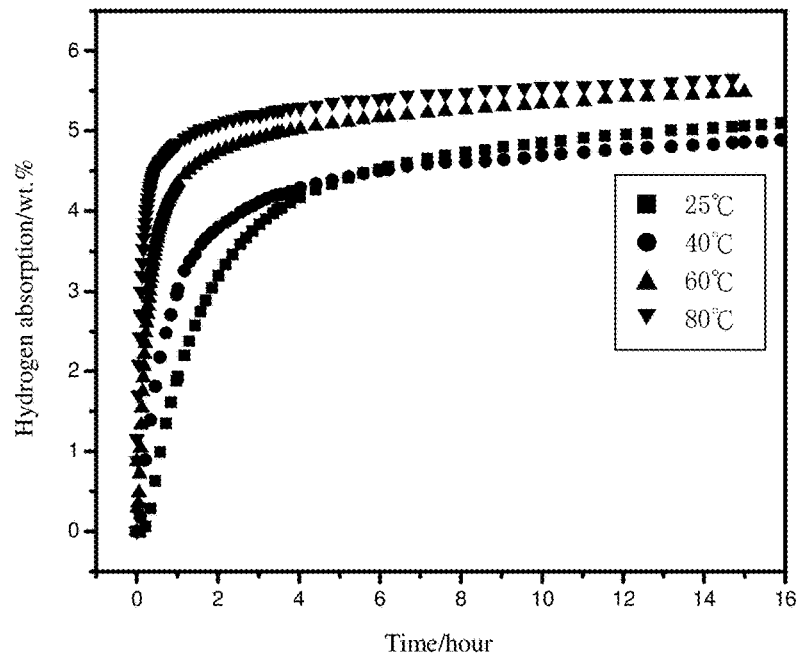
FIG. 2 shows the hydriding-kinetic curves of the $CaMg_{1.9}Ni_{0.1}$ alloy prepared by the present invention, with the varied hydrogen absorption temperature from room temperature to 80° C.
Figure 3:
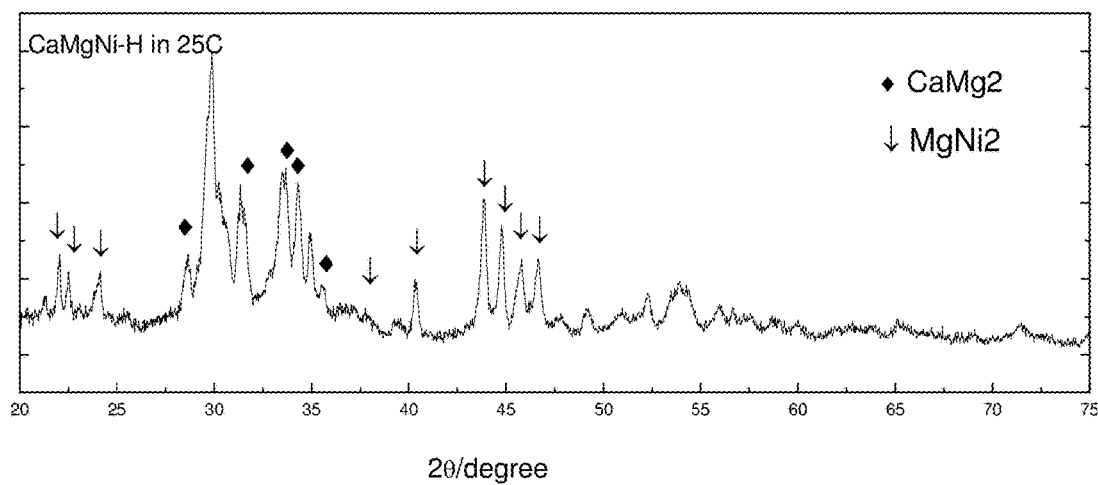
FIG. 3 shows the XRD pattern of the $CaMg_{1.9}Ni_{0.1}$ alloy after hydrogenation at room temperature.
Figure 4:
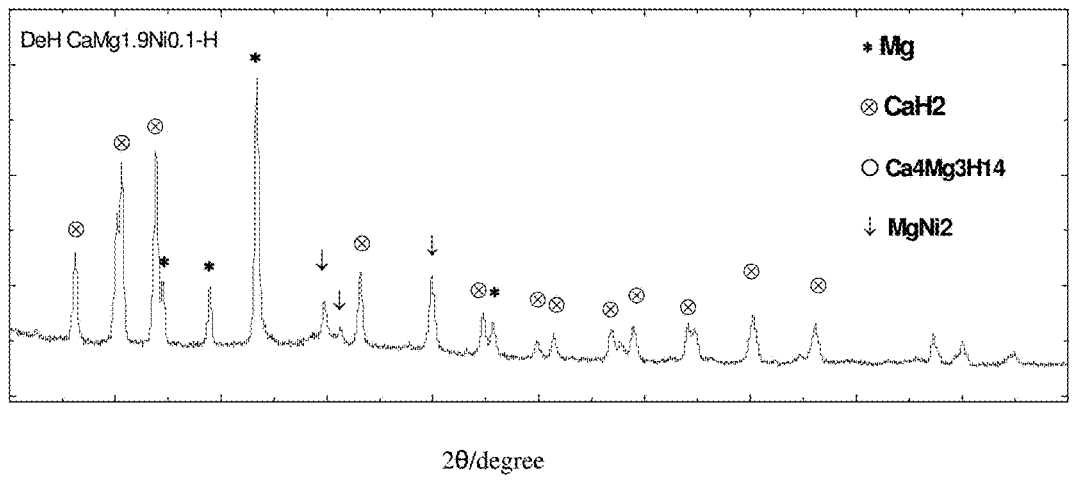
FIG. 4 shows the XRD pattern of the hydrogenated $CaMg_{1.9}Ni_{0.1}$ alloy after dehydrogenation at 320° C.
Figure 5:
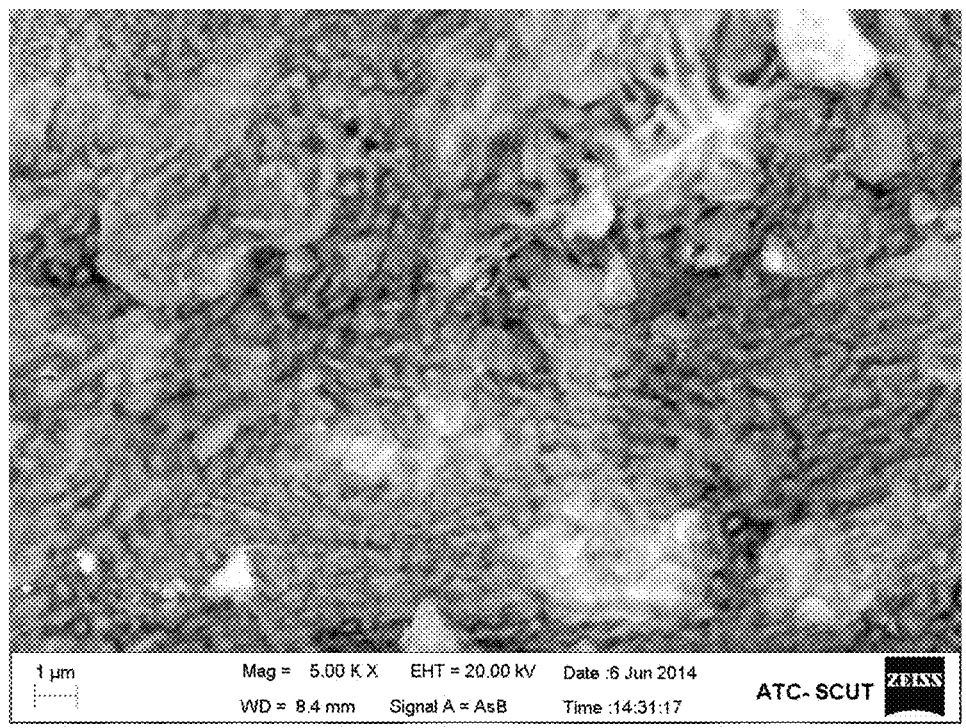
FIG. 5 shows the back scattering electron image of the hydrogenated $CaMg_{1.9}Ni_{0.1}$ alloy.
Figure 6:
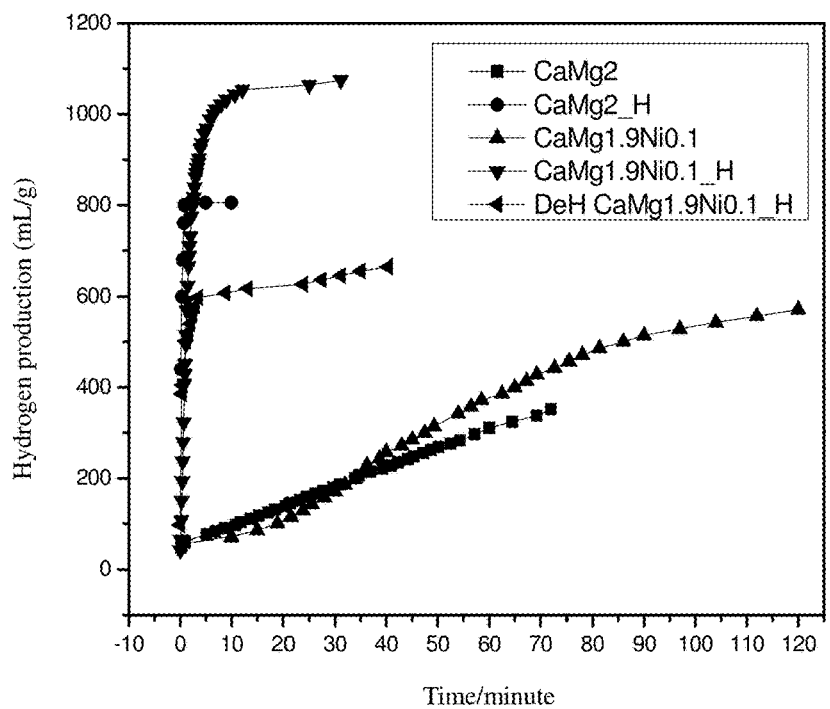
FIG. 6 shows the hydrolysis kinetic curves of the alloys, with all the alloys being 300-mesh particles and subjected to the hydrolysis reaction in pure water. The alloys are the $CaMg_2$ alloy, the hydrogenated $CaMg_2$ alloy, the $CaMg_{1.9}Ni_{0.1}$ alloy, the hydrogenated $CaMg_{1.9}Ni_{0.1}$ alloy, and the dehydrogenated $CaMg_{1.9}Ni_{0.1}$—H alloy, respectively.
Figure 7:
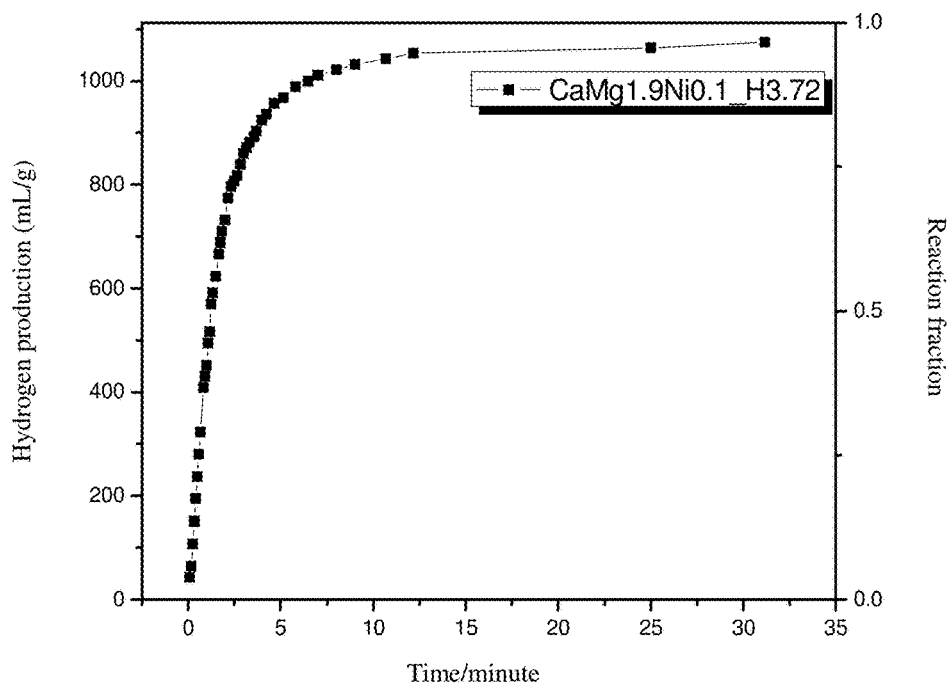
FIG. 7 shows the hydrolysis kinetic curve of the hydrogenated $CaMg_{1.9}Ni_{0.1}$.

The method for the $CaMg_{1.9}Ni_{0.1}$—H hydride comprises the following steps:

Weighing pure metals Ca, Mg and Ni (having the purity greater than 99%) at an atomic ratio of 1:1.9:0.1, with the burning loss of Ca and Mg being 7% and 6%, respectively. And then putting the weighed metals Ca, Mg and Ni in turn into a prepared crucible (provided with a vent), wherein the metal block Ni is placed at the top. Installing the crucible in a high-frequency induction melting furnace, evacuating to $5 \times 10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$ (the X-ray diffraction pattern is shown as the curve d in FIG. 1). Removing the alloy, putting it into a glove box filled with an inert gas and hammer-milling the alloy, and then hydrogenating the hammer-milled hydrogen storage alloy powder at a hydrogenation temperature of 25° C. and a hydrogen pressure of 50 atm for 15 h, thus obtaining a CaMg$_2$-based alloy hydride material for hydrolysis production of hydrogen (the X-ray diffraction pattern is shown in FIG. 3). The alloy is brittle and easy to produce alloy powder. Its hydrogen storage performance has been significantly improved compared to that before alloying, and its hydrogen absorption kinetic curve is shown in FIG. 2, with the hydrogen absorption activation energy reduced by 30%. Hydrolyzing the hydrogenated material to produce hydrogen at room temperature in pure water, the hydrolysis kinetic curve is shown in FIG. 7, with 90% of the theoretical hydrogen production reached within 8 min, having a very good performance of hydrolysis production of hydrogen (FIG. 6).

Example 2

The method for the CaMg$_{1.8}$Ni$_{0.2}$—H hydride comprises the following steps:

Weighing pure metals Ca, Mg and Ni (having the purity greater than 99%) at an atomic ratio of 1:1.8:0.2, with the burning loss of Ca and Mg being 7%. And then putting the weighed metals Ca, Mg and Ni in turn into a prepared crucible (provided with a vent), wherein the metal block Ni is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on CaMg$_2$ (the X-ray diffraction pattern is shown as the curve c in FIG. 1). Removing the alloy, putting it into a glove box filled with an inert gas and hammer-milling the alloy, and then hydrogenating the hammer-milled hydrogen storage alloy powder at a hydrogenation temperature of 40° C. and a hydrogen pressure of 50 atm for 12 h, thus obtaining a CaMg$_2$-based alloy hydride material for hydrolysis production of hydrogen. The alloy is brittle and easy to produce alloy powder. Its hydrogen storage performance has been significantly improved compared to that before alloying, and its hydrogen absorption kinetic curve is shown in FIG. 2, with the hydrogen absorption activation energy reduced by 30%. Hydrolyzing the hydrogenated material to produce hydrogen at room temperature in pure water, the kinetic curve is shown in FIG. 7, with 90% of the theoretical hydrogen production reached within 8 min, having a very good performance of hydrolysis production of hydrogen.

Example 3

The method for the CaMg$_{1.8}$Co$_{0.2}$—H hydride comprises the following steps:

Weighing pure metals Ca, Mg and Co (having the purity greater than 99%) at an atomic ratio of 1:1.8:0.2, with the burning loss of Ca and Mg being 7%. And then putting the weighed metals Ca, Mg and Co in turn into a prepared crucible (provided with a vent), wherein the metal block Co is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on CaMg$_2$ (the X-ray diffraction pattern is shown as the curve a in FIG. 1). Removing the alloy, putting it into a glove box filled with an inert gas and hammer-milling the alloy, and then hydrogenating the hammer-milled hydrogen storage alloy powder at a hydrogenation temperature of 100° C. and a hydrogen pressure of 50 atm for 10 h, thus obtaining a CaMg$_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 10 min, having a very good performance of hydrolysis production of hydrogen.

Example 4

The method for the CaMg$_{1.9}$Co$_{0.1}$—H hydride comprises the following steps:

Weighing pure metals Ca, Mg and Co (having the purity greater than 99%) at an atomic ratio of 1:1.9:0.1, with the burning loss of Ca and Mg being 7% and 6%, respectively. And then putting the weighed metals Ca, Mg and Co in turn into a prepared crucible (provided with a vent), wherein the metal block Co is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on CaMg$_2$. Removing the alloy, putting it into a glove box filled with an inert gas and hammer-milling the alloy, and then hydrogenating the hammer-milled hydrogen storage alloy powder at a hydrogenation temperature of 100° C. and a hydrogen pressure of 50 atm for 14 h, thus obtaining a CaMg$_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 10 min, having a very good performance of hydrolysis production of hydrogen.

Example 5

The method for the CaMg$_{1.8}$Fe$_{0.2}$—H hydride comprises the following steps:

Weighing pure metals Ca, Mg and Fe (having the purity greater than 99%) at an atomic ratio of 1:1.8:0.2, with the burning loss of Ca and Mg being 7%. And then putting the weighed metals Ca, Mg and Fe in turn into a prepared crucible (provided with a vent), wherein the metal block Fe is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$ (the X-ray diffraction pattern is shown as the curve b in FIG. 1). Removing the alloy, putting it into a glove box filled with an inert gas and hammer-milling the alloy, and then hydrogenating the hammer-milled hydrogen storage alloy powder at a hydrogenation temperature of 100° C. and a hydrogen pressure of 50 atm for 10 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 10 min, having a very good performance of hydrolysis production of hydrogen.

Example 6

The method for the $CaMg_{1.9}Fe_{0.1}$—H hydride comprises the following steps:

Weighing pure metals Ca, Mg and Fe (having the purity greater than 99%) at an atomic ratio of 1:1.9:0.1, with the burning loss of Ca and Mg being 7% and 6%, respectively. And then putting the weighed metals Ca, Mg and Fe in turn into a prepared crucible (provided with a vent), wherein the metal block Fe is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$. Removing the alloy, putting it into a glove box filled with an inert gas and hammer-milling the alloy, and then hydrogenating the hammer-milled hydrogen storage alloy powder at a hydrogenation temperature of 100° C. and a hydrogen pressure of 50 atm for 14 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 10 min, having a very good performance of hydrolysis production of hydrogen.

Example 7

The method for the $CaMg_{1.6}Ni_{0.4}$—H hydride comprises the following steps:

Weighing pure metals Ca, Mg and Ni (having the purity greater than 99%) at an atomic ratio of 1:1.6:0.4, with the burning loss of Ca and Mg being 8%. And then putting the weighed metals Ca, Mg and Ni in turn into a prepared crucible (provided with a vent), wherein the metal block Ni is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$. Removing the alloy, putting it into a glove box filled with an inert gas and hammer-milling the alloy, and then hydrogenating the hammer-milled hydrogen storage alloy powder at a hydrogenation temperature of 40° C. and a hydrogen pressure of 50 atm for 10 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 8 min, having a very good performance of hydrolysis production of hydrogen.

Example 8

The method for the $CaMg_{1.6}Co_{0.4}$—H hydride comprises the following steps:

Weighing pure metals Ca, Mg and Co (having the purity greater than 99%) at an atomic ratio of 1:1.6:0.4, with the burning loss of Ca and Mg being 8%. And then putting the weighed metals Ca, Mg and Co in turn into a prepared crucible (provided with a vent), wherein the metal block Co is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$. Removing the alloy, putting it into a glove box filled with an inert gas and hammer-milling the alloy, and then hydrogenating the hammer-milled hydrogen storage alloy powder at a hydrogenation temperature of 80° C. and a hydrogen pressure of 45 atm for 7 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 8 min, having a very good performance of hydrolysis production of hydrogen.

Example 9

The method for the $CaMg_{1.6}Fe_{0.4}$—H hydride comprises the following steps:

Weighing pure metals Ca, Mg and Fe (having the purity greater than 99%) at an atomic ratio of 1:1.6:0.4, with the burning loss of Ca and Mg being 8%. And then putting the weighed metals Ca, Mg and Fe in turn into a prepared crucible (provided with a vent), wherein the metal block Fe is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$. Removing the alloy, putting it into a glove box filled with an inert gas and hammer-milling the alloy, and then hydrogenating the hammer-milled hydrogen storage alloy powder at a hydrogenation temperature of 100° C. and a hydrogen pressure of 50 atm for 8 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 8 min, having a very good performance of hydrolysis production of hydrogen.

Example 10

The method for the $CaMg_{1.9}Ni_{0.1}$—H hydride comprises the following steps:

Weighing pure metals Ca, Mg and Ni (having the purity greater than 99%) at an atomic ratio of 1:1.9:0.1, with the burning loss of Ca and Mg being 7% and 6%, respectively. And then putting the weighed metals Ca, Mg and Ni in turn into a prepared crucible (provided with a vent), wherein the metal block Ni is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$ (the X-ray diffraction pattern is shown as the curve d in FIG. 1). Removing the alloy, putting it into a glove box filled with an inert gas and hammer-milling the alloy, and then hydrogenating the hammer-milled hydrogen storage alloy powder at a hydrogenation temperature of 40° C. and a hydrogen pressure of 50 atm for 8 h, thus obtaining a $CaMg_2$-based alloy hydride material for hydrolysis production of hydrogen. The alloy is brittle and easy to produce alloy powder. Its hydrogen storage performance has been significantly improved compared to that before alloying, and its hydrogen absorption kinetic curve is shown in FIG. 2, with the hydrogen absorption activation energy reduced by 30%. Hydrolyzing the hydrogenated material to produce hydrogen at room temperature in pure water, and the kinetic curve is shown in FIG. 7, with 90% of the theoretical hydrogen production reached within 8 min, having a very good performance of hydrolysis production of hydrogen.

Example 11

The method for the $CaMg_{1.9}Ni_{0.1}$—H hydride comprises the following steps:

Weighing pure metals Ca, Mg and Ni (having the purity greater than 99%) at an atomic ratio of 1:1.9:0.1, with the burning loss of Ca and Mg being 7% and 6%, respectively. And then putting the weighed metals Ca, Mg and Ni in turn into a prepared crucible (provided with a vent), wherein the metal block Ni is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$ (the X-ray diffraction pattern is shown as the curve d in FIG. 1). Removing the alloy, putting it into a glove box filled with an inert gas and hammer-milling the alloy, and then hydrogenating the hammer-milled hydrogen storage alloy powder at a hydrogenation temperature of 60° C. and a hydrogen pressure of 40 atm for 5 h, thus obtaining a $CaMg_2$-based alloy hydride material for hydrolysis production of hydrogen. The alloy is brittle and easy to produce alloy powder. Its hydrogen storage performance has been significantly improved compared to that before alloying, and its hydrogen absorption kinetic curve is shown in FIG. 2, with the hydrogen absorption activation energy reduced by 30%. Hydrolyzing the hydrogenated material to produce hydrogen at room temperature in pure water, and the kinetic curve is shown in FIG. 7, with 90% of the theoretical hydrogen production reached within 8 min, having a very good performance of hydrolysis production of hydrogen.

Example 12

The method for the $CaMg_{1.9}Ni_{0.1}$—H hydride comprises the following steps:

Weighing pure metals Ca, Mg and Ni (having the purity greater than 99%) at an atomic ratio of 1:1.9:0.1, with the burning loss of Ca and Mg being 7% and 6%, respectively. And then putting the weighed metals Ca, Mg and Ni in turn into a prepared crucible (provided with a vent), wherein the metal block Ni is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$ (the X-ray diffraction pattern is shown as the curve d in FIG. 1). Removing the alloy, putting it into a glove box filled with an inert gas and hammer-milling the alloy, and then hydrogenating the hammer-milled hydrogen storage alloy powder at a hydrogenation temperature of 80° C. and a hydrogen pressure of 40 atm for 3 h, thus obtaining a $CaMg_2$-based alloy hydride material for hydrolysis production of hydrogen. The alloy is brittle and easy to produce alloy powder. Its hydrogen storage performance has been significantly improved compared to that before alloying, and its hydrogen absorption kinetic curve is shown in FIG. 2, with the hydrogen absorption activation energy reduced by 30%. Hydrolyzing the hydrogenated material to produce hydrogen at room temperature in pure water, and the kinetic curve is shown in FIG. 7, with 90% of the theoretical hydrogen production reached within 8 min, having a very good performance of hydrolysis production of hydrogen.

Example 13

The method for the $CaMg_{1.8}Co_{0.2}$—H hydride comprises the following steps:

Weighing pure metals Ca, Mg and Co (having the purity greater than 99%) at an atomic ratio of 1:1.8:0.2, with the burning loss of Ca and Mg being 7%. And then putting the weighed metals Ca, Mg and Co in turn into a prepared crucible (provided with a vent), wherein the metal block Co is placed at the top. Installing the crucible in a high-frequency induction melting furnace, evacuating to $5 \times 10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$ (the X-ray diffraction pattern is shown as the curve a in FIG. 1). Removing the alloy, putting it into a glove box filled with an inert gas and hammer-milling the alloy, and then hydrogenating the hammer-milled hydrogen storage alloy powder at a hydrogenation temperature of 80° C. and a hydrogen pressure of 55 atm for 8 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 10 min, having a very good performance of hydrolysis production of hydrogen.

Example 14

The method for the $CaMg_{1.8}Fe_{0.2}$—H hydride comprises the following steps:

Weighing pure metals Ca, Mg and Fe (having the purity greater than 99%) at an atomic ratio of 1:1.8:0.2, with the burning loss of Ca and Mg being 7%. And then putting the weighed metals Ca, Mg and Fe in turn into a prepared crucible (provided with a vent), wherein the metal block Fe is placed at the top. Installing the crucible in a high-frequency induction melting furnace, evacuating to $5 \times 10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$ (the X-ray diffraction pattern is shown as the curve b in FIG. 1). Removing the alloy, putting it into a glove box filled with an inert gas and hammer-milling the alloy, and then hydrogenating the hammer-milled hydrogen storage alloy powder at a hydrogenation temperature of 80° C. and a hydrogen pressure of 50 atm for 8 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 10 min, having a very good performance of hydrolysis production of hydrogen.

Example 15

The method for the $CaMg_{1.6}Ni_{0.4}$—H hydride comprises the following steps:

Weighing pure metals Ca, Mg and Ni (having the purity greater than 99%) at an atomic ratio of 1:1.6:0.4, with the burning loss of Ca and Mg being 8%. And then putting the weighed metals Ca, Mg and Ni in turn into a prepared crucible (provided with a vent), wherein the metal block Ni is placed at the top. Installing the crucible in a high-frequency induction melting furnace, evacuating to $5 \times 10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$. Removing the alloy, putting it into a glove box filled with an inert gas and hammer-milling the alloy, and then hydrogenating the hammer-milled hydrogen storage alloy powder at a hydrogenation temperature of 80° C. and a hydrogen pressure of 50 atm for 6 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 8 min, having a very good performance of hydrolysis production of hydrogen.

Example 16

The method for the $CaMg_{1.6}Co_{0.4}$—H hydride comprises the following steps:

Weighing pure metals Ca, Mg and Co (having the purity greater than 99%) at an atomic ratio of 1:1.6:0.4, with the burning loss of Ca and Mg being 8%. And then putting the weighed metals Ca, Mg and Co in turn into a prepared crucible (provided with a vent), wherein the metal block Co is placed at the top. Installing the crucible in a high-frequency induction melting furnace, evacuating to $5 \times 10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$. Removing the alloy, putting it into a glove box filled with an inert gas and hammer-milling the alloy, and then hydrogenating the hammer-milled hydrogen storage alloy powder at a hydrogenation temperature of 40° C. and a hydrogen pressure of 45 atm for 10 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 8 min, having a very good performance of hydrolysis production of hydrogen.

Example 17

The method for the $CaMg_{1.6}Fe_{0.4}$—H hydride comprises the following steps:

Weighing pure metals Ca, Mg and Fe (having the purity greater than 99%) at an atomic ratio of 1:1.6:0.4, with the burning loss of Ca and Mg being 8%. And then putting the weighed metals Ca, Mg and Fe in turn into a prepared crucible (provided with a vent), wherein the metal block Fe is placed at the top. Installing the crucible in a high-frequency induction melting furnace, evacuating to $5\times10^{-3}$ Pa, and then introducing 0.5 atm argon gas as a protective gas. Starting the high-frequency induction melting furnace to heat at a low power for 2 to 3 min, then increasing the power to melt the alloy into a liquid and keeping for 1 min to uniformly fuse the same, and thereafter cooling with the furnace to obtain an alloy ingot, and then cooling with the furnace after remelting 2 times to obtain a hydrogen storage alloy based on $CaMg_2$. Removing the alloy, putting it into a glove box filled with an inert gas and hammer-milling the alloy, and then hydrogenating the hammer-milled hydrogen storage alloy powder at a hydrogenation temperature of 40° C. and a hydrogen pressure of 50 atm for 12 h, thus obtaining a $CaMg_2$-based alloy hydride material for hydrolysis production of hydrogen. The alloy is brittle and easy to produce alloy powder. Its hydrogen storage performance has been significantly improved compared to that before alloying, with the hydrogen absorption activation energy reduced by 30%. Hydrolyzing the hydrogenated material for hydrolysis production of hydrogen at room temperature in pure water, with 90% of the theoretical hydrogen production reached within 10 min, having a very good performance of hydrolysis production of hydrogen.

What is claimed is:

1. A $CaMg_2$-based alloy hydride material for hydrolysis production of hydrogen, characterized in that: it has a general formula of $CaMg_xM_yH_z$, wherein M is Ni, Co or Fe, $1.5 \leq x < 2.0$, $0 < y \leq 0.5$, and $3 \leq z < 6$.

2. The method for making the material according to claim 1, characterized in that: it comprises the following steps:
   (1) stacking three pure metal block materials of Ca, Mg and M in a crucible, wherein the metal block material M is placed at the top;
   (2) installing the crucible in step (1) in a high-frequency induction melting furnace, evacuating and introducing an argon gas as a protective gas, with the crucible having a vent higher than the total height of the block materials;
   (3) starting the high-frequency induction melting furnace, then increasing the power to melt the metal block materials into a liquid, maintaining the power for a certain period of time to uniformly fuse the block materials; thereafter cooling the furnace to obtain an alloy ingot, and hammer-milling the alloy ingot to obtain the $CaMg_2$-based hydrogen storage alloy; and
   (4) hydrogenating the hammer-milled hydrogen storage alloy at a hydrogenation temperature of 25° C.-100° C. and a hydrogen pressure of 40-60 atm for 1-15 h, thus obtaining the $CaMg_2$-based alloy hydride material for hydrolysis production of hydrogen.

3. The method according to claim 2, wherein the atomic ratio of Ca:Mg:M in step (1) is 1:(1.8-1.9):(0.1-0.2).

4. The method according to claim 3, characterized in that: Ca and Mg in step (1) are in excess by 6% to 8% to compensate for burning loss.

5. The method according to claim 4, characterized in that: in step (1) the purity of Ca≥95%, and the purity of Mg and M≥99%.

6. The method according to claim 3, characterized in that: in step (1) the purity of Ca≥95%, and the purity of Mg and M≥99%.

7. The method according to claim 3, characterized in that: in step (2), the crucible is evacuated to $5\times10^{-3}$ Pa, and the pressure of the introduced argon is 0.5 atm.

8. The method according to claim 3, characterized in that: the alloy ingot in step (3) is repeatedly molten 2 to 3 times according to the previous heating and cooling steps.

9. The method according to claim 2, characterized in that: in step (1) the purity of Ca≥95%, and the purity of Mg and M≥99%.

10. The method according to claim 2, characterized in that: in step (2), the crucible is evacuated to $5\times10^{-3}$ Pa, and the pressure of the introduced argon is 0.5 atm.

11. The method according to claim 2, characterized in that: the alloy ingot in step (3) is repeatedly molten 2 to 3 times according to the previous heating and cooling steps.

12. The method according to claim 2, characterized in that: the process of stacking the pure metal block materials into the crucible and the process of hammer-milling the alloy ingot in step (3) are carried out in a glove box filled with an inert gas.

13. The method according to claim 2, characterized in that: the process of stacking the pure metal block materials into the crucible and the process of hammer-milling the alloy ingot in step (3) are carried out in a glove box filled with an inert gas.

* * * * *